US012262182B2

(12) United States Patent
Ma et al.

(10) Patent No.: US 12,262,182 B2
(45) Date of Patent: Mar. 25, 2025

(54) BONE CONDUCTION-BASED CLAMPING DEVICE AND PROCESSING METHOD

(71) Applicant: THUNDER BLAST TECHNOLOGY CO., LIMITED, Hong Kong (CN)

(72) Inventors: Lei Ma, Hong Kong (CN); Jia Hong Ma, Hong Kong (CN); Mi Le Zhang, Hong Kong (CN); Yau Ming Chiu, Hong Kong (CN)

(73) Assignee: THUNDER BLAST TECHNOLOGY CO., LIMITED, Hong Kong (CN)

( * ) Notice: Subject to any disclaimer, the term of this patent is extended or adjusted under 35 U.S.C. 154(b) by 225 days.

(21) Appl. No.: 18/073,299

(22) Filed: Dec. 1, 2022

(65) Prior Publication Data

US 2023/0099026 A1 Mar. 30, 2023

Related U.S. Application Data

(63) Continuation of application No. PCT/CN2020/093924, filed on Jun. 2, 2020.

(51) Int. Cl.
*H04R 25/00* (2006.01)

(52) U.S. Cl.
CPC ......... *H04R 25/606* (2013.01); *H04R 25/305* (2013.01); *H04R 25/602* (2013.01); *H04R 25/603* (2019.05); *H04R 2460/13* (2013.01)

(58) Field of Classification Search
CPC .. H04R 25/606; H04R 25/603; H04R 25/305; H04R 25/602; H04R 2460/13

(Continued)

(56) References Cited

U.S. PATENT DOCUMENTS

2009/0226011 A1 9/2009 Abolfathi
2017/0118563 A1 4/2017 Maas

FOREIGN PATENT DOCUMENTS

CN 205963331 U 2/2017
CN 208675541 U 3/2019

(Continued)

OTHER PUBLICATIONS

Translation of WO2020/244246A Shenzhen "Music playing device coupled to lollipop" (Year: 2020).*

(Continued)

*Primary Examiner* — Andrew Sniezek
(74) *Attorney, Agent, or Firm* — J.C. PATENTS

(57) ABSTRACT

The present disclosure provides a bone conduction-based clamping device and processing method. The device includes a handle, a clamping structure provided on one side of the handle, and a sound generating processor provided inside the handle. A user puts food into his mouth cavity by clamping the food with the clamping structure, and a vibration signal generated by the sound generating processor is transmitted to the food by the clamping structure and then transmitted to the user's auditory system by an oral tissue or teeth of the user, thereby avoiding the pressing feeling caused by wearing in a pressing manner. Putting the clamping structure into the user's mouth cavity can also reduce sound leakage, improve sound quality and protect privacy. In addition, the food can be replaced by the clamping structure, thereby guaranteeing hygiene and health, improving the usage rate of the device, and realizing multi-user sharing.

12 Claims, 6 Drawing Sheets

(58) Field of Classification Search
USPC .......................................................... 381/151
See application file for complete search history.

(56) References Cited

FOREIGN PATENT DOCUMENTS

| | | | | | |
|---|---|---|---|---|---|
| CN | 208770034 | U | | 4/2019 | |
| CN | 109756834 | A | * | 5/2019 | |
| CN | 110956949 | A | | 4/2020 | |
| JP | 3056997 | U | | 3/1999 | |
| JP | 2000175280 | A | | 6/2000 | |
| JP | 2005111959 | A | | 4/2005 | |
| JP | 2009125520 | A | | 6/2009 | |
| JP | 2014143582 | A | | 8/2014 | |
| JP | 6654721 | B1 | | 2/2020 | |
| JP | 2020053843 | A | | 4/2020 | |
| WO | WO-2020244246 | A1 | * | 12/2020 | ............. A23G 3/563 |

OTHER PUBLICATIONS

Translation of CN109756834 Yang “Method, device and system for bone conduction processing of audio data” (Year: 2019).*
Translation of JP2000175280 Nakamura “Bone Conduction Device” (Year 2000).*
First Office Action of the parallel application JP2022-574601 Jan. 2024.
International Search Report and Written Opinion of PCT/CN2020/093924.
First Office Action of the corresponding application CN202080101561.4.

* cited by examiner

BONE CONDUCTION-BASED CLAMPING DEVICE AND PROCESSING METHOD

CROSS-REFERENCE TO RELATED APPLICATION

The present application is a continuation of International Application No. PCT/CN2020/093924, filed on Jun. 2, 2020, which is hereby incorporated by reference in its entirety.

TECHNICAL FIELD

The present application relates to the field of bone conduction, and in particular, to a bone conduction-based clamping device and processing method.

BACKGROUND

Bone conduction is a sound conduction method, that is, sounds are converted to mechanical vibration of different frequencies, which transmit vibration waves through human skull, bone labyrinth, endolymph, spiral organ, auditory nerve and auditory center, and sound information is finally obtained through the perception of cerebral cortex.

Different from air-conducted sound transmission, in which a sound is transmitted by air vibration, a sound transmission method of a traditional bone conductive device mainly transmits a sound by pressing to contact with a body surface of an object of use, for example, by pressing against a part such as temple, forehead, and the like via a wearing element. However, the contact with the body surface will cause the following problems: firstly, there will be a large number of bacteria on a surface, especially a portion with which the body surface contacts, of the bone conductive device used for a long time, which will lead to hygiene and health problems; secondly, the contact portion is integrated with the device, and cannot be replaced; thirdly, it is impossible to achieve multi-user sharing or reuse, that is, the utilization rate is low among different users.

In addition, most of the existing bone conductive devices mainly transmit sounds by vibration on body surfaces, which will drive the air around the devices to vibrate together, resulting in sound leakage. The sound leakage will affect the sound quality of the sounds actually received by users and is not conducive to protecting the privacy of the users.

SUMMARY

A technical problem solved by the disclosure is how to make a contact part avoid a pressing feeling, ensure the health of the contact part, and improve the utilization rate of a bone conductive device at the same time.

In the first aspect, the present disclosure provides a bone conduction-based clamping device including a handle, a clamping structure provided on one side of the handle, and a sound generating processor provided inside the handle;

wherein the sound generating processor includes a controller and a sound generating member;

the controller is configured to drive the sound generating member to generate a vibration signal when the controller determines that food clamped by the clamping structure enters a mouth cavity, and transmit the vibration signal to an auditory system of a user by the food and/or the clamping structure when the food is in contact with an inside of the mouth cavity and/or teeth.

Optionally, the clamping structure is an elastic clamping structure or a clamp-type clamping structure.

Optionally, the clamping structure is a nut clamping structure including a clamping nut and a clamping claw.

In a possible design, the controller is further configured to determine a type of the food and determine a sound source that is matched with the type of the food;

the controller is specifically configured to drive the sound generating member to generate a corresponding vibration signal according to the matched sound source and a played sound volume, when the controller determines that the food clamped by the clamping structure enters the mouth cavity.

In a possible design, the controller is further configured to stop driving the sound generating member and determine a duration for which a whole or a part of the clamping structure is held in the mouth cavity, when the controller determines that the clamping structure does not clamp the food and the whole or the part of the clamping structure enters the mouth cavity;

the controller is further configured to re-drive the sound generating member to generate the vibration signal, when the controller determines that the duration is greater than a preset duration threshold.

In a possible design, the sound generating member includes one or more combinations of the following:

a piezoelectric bone-conductive sound generating member and an electromagnetic bone-conductive sound generating member.

In a possible design, the bone conduction-based clamping device according to any one of the above further includes a switching element provided on the handle;

the controller is further configured to drive the sound generating member to generate the vibration signal when the controller determines that the switching element is activated, and transmit the vibration signal to the auditory system of the user by the food and/or the clamping structure when the food is in contact with the inside of the mouth cavity and/or the teeth.

In a possible design, the bone conduction-based clamping device according to any one of the above further includes a communication interface, and the communication interface comprises one or more combinations of the following:

a USB interface, an eSATA interface, a SD card interface, a Micro SD card interface, an audio input interface, a video input interface, a Wi-Fi interface, a bluetooth interface, a metal electrode, and a microphone.

In a possible design, the bone conduction-based clamping device according to any one of the above further includes a power supply element that is configured to supply power to the controller and the sound generating member.

In the second aspect, the present disclosure provides a bone conduction-based clamping processing method, and the method is applied to the bone conduction-based clamping device according to any one of the above, the method includes:

- the controller is configured to determine whether the food clamped by the clamping structure enters the mouth cavity;
- the controller is configured to drive the sound generating member to generate the vibration signal when the controller determines that the food clamped by the clamping structure enters the mouth cavity, and transmit the vibration signal to the auditory system of the user by the food and/or the clamping structure when the food is in contact with the inside of the mouth cavity and/or the teeth.

Optionally, the method further includes:

the controller is configured to determine the type of the food and determine the sound source that is matched with the type of the food;

driving the sound generating member to generate the vibration signal includes: driving the sound generating member to generate the corresponding vibration signal according to the matched sound source.

Optionally, the method further includes:

the controller is configured to, according to the sizes of the teeth inside the mouth cavity that are acquired by the controller, determine the type of the user corresponding to the mouth cavity, determine the sound source that is matched with the type of the user, and determine the sound volume to be played;

driving the sound generating member to generate the vibration signal includes: driving the sound generating member to generate the corresponding vibration signal according to the matched sound source, and the played sound volume.

Optionally, the method further includes:

the controller is configured to stop driving the sound generating member and determine the duration for which the whole or the part of the clamping structure is held in the mouth cavity, when the controller determines that the clamping structure does not clamp the food and the whole or the part of the clamping structure enters the mouth cavity;

the controller is configured to re-drive the sound generating member to generate the vibration signal, when the controller determines that the duration is greater than the preset duration threshold.

For a bone conduction-based clamping device and processing method provided by the present disclosure, the device includes a handle, a clamping structure provided on one side of the handle, and a sound generating processor provided inside the handle. A user puts food into his mouth cavity by clamping the food with the clamping structure, and a vibration signal generated by the sound generating processor is transmitted to the food by the clamping structure and then transmitted to the user's auditory system by an oral tissue or teeth of the user, thereby avoiding the pressing feeling caused by wearing in a pressing manner. Putting the clamping device into the user's mouth cavity can also reduce sound leakage, improve sound quality and protect privacy. In addition, the food can also be replaced by the clamping structure, thereby guaranteeing hygiene and health, further improving the usage rate of the device, realizing multi-user sharing, and achieving the effects of energy conservation and environmental protection.

BRIEF DESCRIPTION OF DRAWINGS

To describe the technical solutions in embodiments of the present disclosure or in the prior art more clearly, the following briefly introduces the accompanying drawings needed for describing the embodiments or the prior art. Apparently, the accompanying drawings in the following description illustrate merely some embodiments of the present disclosure, and those skilled in the art may still derive other drawings from these accompanying drawings without creative effort.

Figure 1:
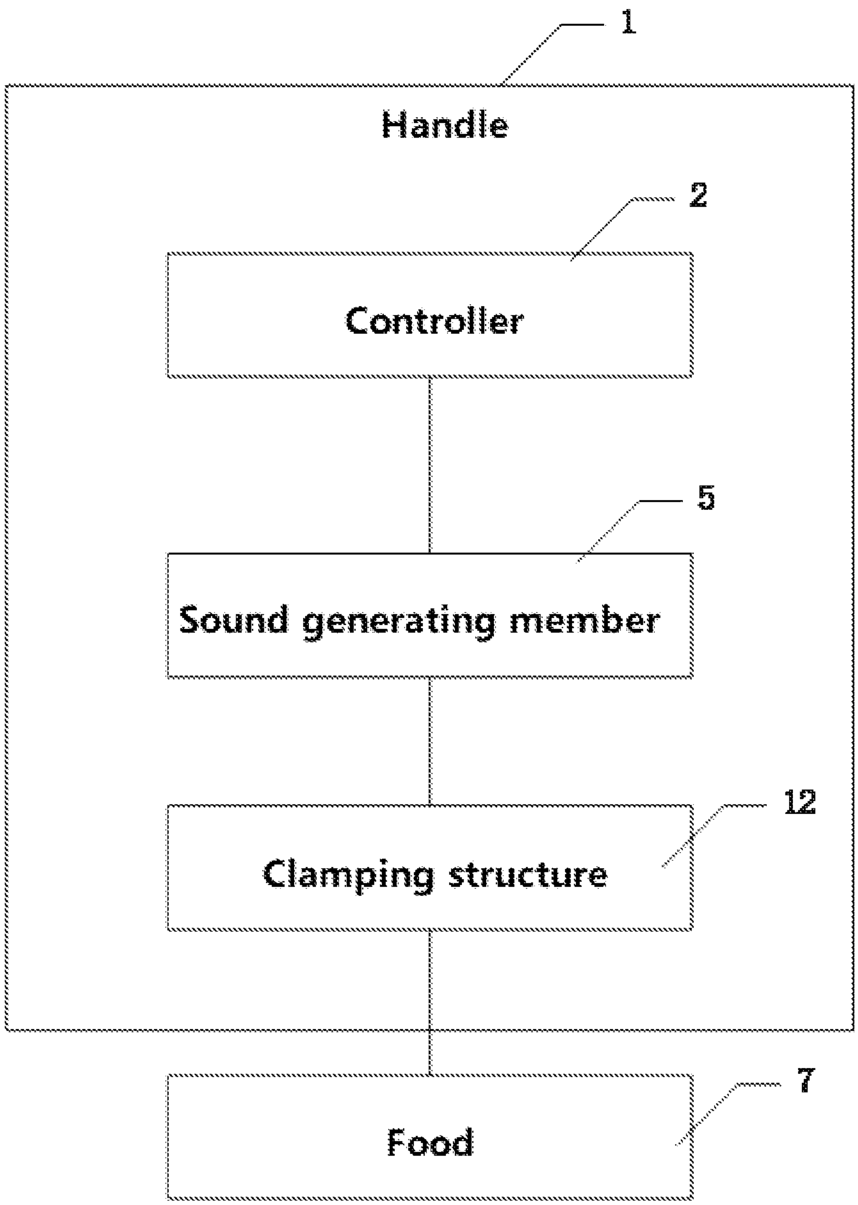
FIG. 1 is a schematic structural diagram of a bone conduction-based clamping device according to an embodiment of the present disclosure.

Through the above drawings, specific embodiments of the present disclosure have been shown, which will be described in more detail later. These drawings and textual descriptions are not intended to limit the scope of the idea of the present disclosure in any way, but to illustrate the concept of the present disclosure for those skilled in the art with reference to specific embodiments.

DESCRIPTION OF EMBODIMENTS

To make the objectives, technical solutions, and advantages of embodiments of the present disclosure clearer, the following clearly and comprehensively describes the technical solutions in embodiments of the present disclosure with reference to the accompanying drawings in embodiments of the present disclosure. Apparently, the described embodiments are merely a part rather than all embodiments of the present disclosure. All other embodiments obtained by those skilled in the art based on embodiments of the present disclosure without creative effort shall fall within the protection scope of the present disclosure.

The terms "first", "second", "third", "fourth" and so on (if exists) in the specification, claims, and the above drawings of the present disclosure are used to distinguish similar objects and do not have to be used to describe specific order or precedence order. It should be understood that the data used in this way can be interchangeable where appropriate so that embodiments of the present disclosure described herein, for example, can be implemented in an order except for those illustrated or described herein. In addition, the terms "include" and "have" and any variant thereof are intended to cover non-exclusive inclusion, for example, processes, methods, systems, products or devices that contain a series of steps or units need not be limited to those steps or units that clearly listed, but may include other steps or units that are not clearly listed or inherent to these processes, methods, products or devices.

The following is a detailed explanation of the technical solution of the present disclosure and how the technical solution of the present application solves the above technical problems with specific embodiments. The following specific embodiments may be combined with each other, and the same or similar concepts or processes may no longer be repeated in some embodiments. Embodiments of the present disclosure will be described below in combination with the drawings.

In the prior art, when a bone conductive device is used, it usually needs to be worn behind ears, temples, forehead and other parts, and it fits to a body surface by pressing to transmit vibration to a skin tissue, a muscle tissue and a bone until an auditory system. However, this method of wearing is not convenient for a user to fix a position of the bone conductive sound device when in use, and needs the bone conductive device and the fitting part to be closely fitted by being pressed in order to ensure a certain sound quality, resulting in a certain pressing feel to the user when in use.

The contact between the bone conductive device and the body surface will also cause the following problems: firstly, there will be a large number of bacteria on a surface, especially a portion with which the body surface contacts, of the bone conductive device used for a long time, which will lead to health and health problems; secondly, the contact portion is integrated with the device and cannot be replaced; thirdly, it is impossible to achieve multi-user sharing or reuse, that is, the utilization rate is low among different users.

In addition, most of the existing bone conductive devices transmit sounds by vibration on body surfaces, which will drive the air around the devices to vibrate together, resulting in sound leakage. The sound leakage will affect the sound quality of the sounds actually received by users, and is not conducive to protecting the privacy of the users.

Furthermore, bone conductive sound devices in the prior art also have defects such as narrow frequency domain, and so on, which leads to the problem of poor sound quality. Although the sound quality can be improved by setting up multiple bone conductive sound devices, the number, volume and weight of the devices required will be greatly increased, which will further lead to inconvenience and pressing feel in wearing. In addition, especially when a bone conductive device is worn behind a user's ear, temple, forehead and other parts, it will also be limited by the usable space, that is, the sound quality cannot be improved by increasing the number of devices.

Based on the above technical problems, the present embodiment provides a bone conduction-based clamping device including a handle, a clamping structure provided on one side of the handle, and a sound generating processor provided inside the handle. A user puts food into his mouth cavity by clamping the food with the clamping structure, and a vibration signal generated by the sound generating processor is transmitted to the food by the clamping structure and then transmitted to the user's auditory system by an oral tissue or teeth of the user, thereby avoiding the pressing feeling caused by wearing in a pressing manner. Putting the clamping structure into the user's mouth cavity can also reduce sound leakage, improve sound quality, and protect privacy. In addition, the food can also be replaced by the clamping structure, thereby guaranteeing hygiene and health, improving the usage rate of the device, realizing multi-user sharing, and achieving the effects of energy conservation and environmental protection.

FIG. 1 is a schematic structural diagram of a bone conduction-based clamping device according to an embodiment of the present disclosure. As shown in FIG. 1, the bone conduction-based clamping device of the present embodiment includes a handle 1, at least one clamping structure 12 provided on one side of the handle 1, and a sound generating processor provided inside the handle, and the sound generating processor includes at least one controller 2 and at least one sound generating member 5.

The controller 2 can be used to control the clamping structure 12 to clamp food 7. When the food 7 enters a user's mouth cavity, or the user holds or bites the food 7, the controller 2 detects this state, and then drives the sound generating member 5 to generate a vibration signal. The vibration signal can be transmitted, by the handle 1 connected with the sound generating member, to the clamping structure 12 and then to the food 7, and finally transmitted to the user's auditory system by an inside of the mouth cavity, or dental contact.

The food 7 includes foods such as candy, chocolate, tooth grinding sticks, jerky, etc., and it can also be medicine, and food 7 can also be made up of two or more different edible substances.

In one possible embodiment, the food 7 includes an outer layer and an inner layer, and the outer layer covers an outside of the inner layer. The inner layer can be a liquid material, such as liquid syrup or other liquid edible materials. The outer layer can be a rigid material or a hard colloid material, which is suitable for contacting with teeth to conduct the vibration signal and can prevent the liquid in the inner layer from flowing out. The liquid material in the inner layer includes a solution, a suspension, and an emulsion.

Optionally, the food 7 is a rigid material, or a colloidal material with high hardness, which is suitable for conducting the vibration signal. A colloidal material refers to a semi-solid gel material that can maintain a certain form, such as agar and so on.

Optionally, the food 7 represents an object that can enter the mouth cavity or ear canal or nasal cavity. The food 7 is made of a healthy material that can ensure the health of users.

In this embodiment, the cleanliness and hygiene of the food 7 that a user contacts can be ensured by changing the food 7. After the food 7 is used, the handle 1 can also clamp other forms of food 7 by the clamping structure 12, which improves the utilization rate of the handle 1. In addition, the food 7 can be made into various shapes, such as various shapes of lollipops or pharmaceuticals, so that the user can have a variety of choices and make choices according to the user's own interests or purpose. For example, if children do not want to take medicine, medicines in cartoon shape may be used to attract the children to take. For example again, the food 7 is a lollipop of different shapes, and the user can choose different shapes according to his own preferences, thereby improving the user's sense of experience. In addition, by replacing the food 7 by the clamping structure 12, it can be allowed for the handle 1 to be used by a plurality of users in turn, thereby improving the utilization rate of the clamping device of the present embodiment among different users.

It should be understood that the user mentioned in this embodiment can be human beings or other animals having a mouth cavity, such as a puppy or a kitten. This embodiment does not limit to the user. In this embodiment and in subsequent examples, that an entertainment device for producing a sound by bone conduction is mainly applied to human beings is taken as an example for explaining in detail.

The present embodiment provides a bone conduction-based clamping device, includes a handle, a clamping structure provided on one side of the handle, and a sound generating processor provided inside the handle. A user puts food into his mouth cavity by clamping the food with the clamping structure, and a vibration signal generated by the sound generating processor is transmitted to the food by the clamping structure and then transmitted to the user's auditory system by an oral tissue or teeth of the user, thereby avoiding the pressing feeling caused by wearing in a pressing manner. Putting the clamping structure into the user's mouth cavity can also reduce sound leakage, improve sound quality and protect privacy. In addition, the food can also be replaced by the clamping structure, thereby guaranteeing hygiene and health, improving the usage rate of the device, realizing multi-user sharing, and achieving the effects of energy conservation and environmental protection.

Figure 2:
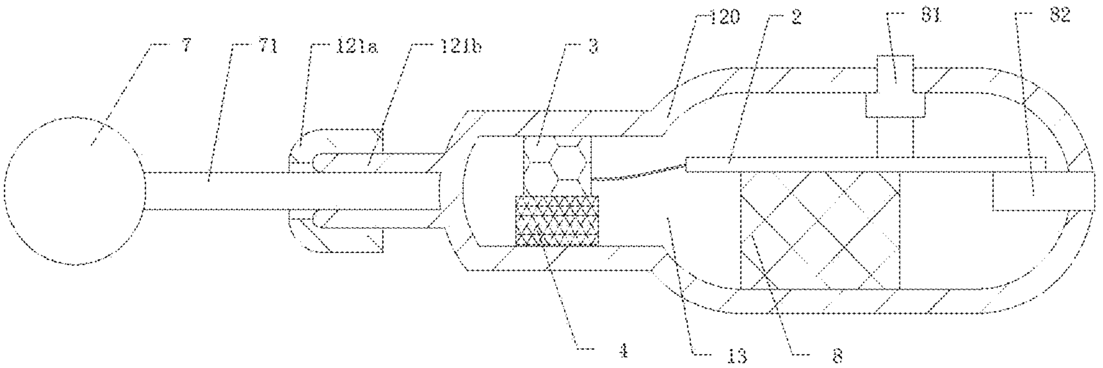
FIG. 2 is a schematic structural diagram of a bone conduction-based clamping device according to one embodiment of the present disclosure.

FIG. 2 is a schematic structural diagram of a bone conduction-based clamping device according to an embodiment of the present disclosure. As shown in FIG. 2, in the present embodiment, a handle 1 includes a main body portion 120 and at least one clamping structure connected to the main body portion 120, and the clamping structure can be detachably connected to food 7 to fix the food 7. A sound generating member and a controller 2 are provided in the main body portion 120 and are connected by a wire. The sound generating member includes at least one electric receiving element 3 and at least one vibrating element 4. The vibrating element 4 is mechanically connected with the clamping structure of the handle 1, and the controller 2 is electrically connected with the electric receiving element 3 and transmits an electrical signal containing sound information to at least one electric receiving element 3. The electric receiving element 3 is stimulated by the electrical signal and drives the vibrating element 4 to generate a vibration signal, and the vibration signal is transmitted to the food 7 by the clamping structure of the handle 1. The vibration signal is suitable to be transmitted to an auditory system by bone conduction. After the clamping structure is connected to the food 7, and when the food 7 is in contact with a mouth cavity, the vibration signal is transmitted to the auditory system by the handle 1 and the food 7 in a manner of bone conduction. When the handle 1 is directly in contact with the mouth cavity, the vibration signal can also be transmitted to the auditory system by the handle 1 in a manner of bone conduction.

In the present embodiment, the clamping structure includes at least one clamping nut 121*a* and at least one clamping claw 121*b*. As shown in FIG. 2, a connecting end 71 of the food 7 is inserted into an accommodation space formed by the clamping claw 121*b*. An outer surface of the clamping claw 121*b* may have an external thread, while the clamping nut 121*a* may have a corresponding internal thread, and the clamping nut 121*a* and the clamping claw 121*b* are connected by the threads.

In the present embodiment, the clamping structure 12 includes at least one clamping nut 121*a* and at least one clamping claw 121*b*. As shown in FIG. 2, a connecting end 71 of the food 7 is inserted into an accommodation space formed by the clamping claw 121*b*. An outer surface of the clamping claw 121*b* may have an external thread, while the clamping nut 121*a* may have a corresponding internal thread, and the clamping nut 121*a* and the clamping claw 121*b* are connected by the threads.

Optionally, the clamping nut 121*a* and the clamping claw 121*b* can also be connected by interference fit, or can be tightened by plug-in structure, or can be connected by other means without setting the threads.

When the clamping nut 121*a* is not connected with the clamping claw 121*b*, the clamping claw 121*b* is in a natural state, and the accommodation space formed by the clamping claw 121*b* is the largest and can be passed through by the connecting end 71. When the clamping nut 121*a* is connected with the clamping claw 121*b*, the accommodation space of the clamping claw 121*b* becomes smaller due to elastic deformation thereof, resulting in clamping the connecting end 71. When the food 7 needs to be removed, the clamping nut 121*a* can be separated from the clamping claw 121*b*, and the connecting end 71 can be successfully removed from the fixing device.

It should be explained that the difference between the sound generating member 5 of this embodiment and a sound generating member in a traditional bone-conductive sound generating device is that the traditional sound generating member has an independent shell that packages a sound generating member. The existing technical means to improve sound quality of the bone-conductive sound generating device is to increase the number of sound generating members having different frequency domains, but the traditional sound generating members are packaged separately, which makes the volume and weight of shells increase geometrically, thereby increasing production cost accordingly. In addition, since the packaged shells will increase the transmission distance of vibration, a vibration signal will be attenuated, that is, resulting in sound quality loss of a sound.

In practice, the inventor of the present application has creatively explored and found that the packaging form of the sound generating member 5 may be those in the following: a plurality of elements for executing vibration are integrated together, that is, a plurality of electric receiving elements 3 and a plurality of vibrating elements 4 are integrated together; or the packaging can be realized by the handle 1 of the bone conduction-based clamping device, that is, the sound generating member 5 is embedded in a cavity 13 formed by the handle 1, or the handle 1 wraps the sound generating member 5; or the sound generating member 5 may also be packaged into a common package with the controller 2, as shown in FIG. 2, that is, the sound generating member 5 is integrated with the controller 2; or the sound generating member 5 may also be packaged into an integrated package with the controller 2 and the handle 1, as shown in FIG. 2, that is, the three are integrated into the cavity 13 formed by a housing of the handle 1.

Optionally, the bone conduction-based clamping device of the present embodiment may further include a power supply member, such as a power supply 8 in FIG. 2, to supply power for the controller and the sound generating member. The power supply member may be a removable dry battery or a button battery; a rechargeable battery; or a supercapacitor; or a device that can convert mechanical energy into electrical energy by movements such as shaking, for example, a structure in a mechanical watch, which converts mechanical energy into electrical energy by shaking an arm and gravitation; a device which makes different portions of a semiconductor material produce pressure difference by occlusion to convert occlusal mechanical energy into electrical energy; or a solar cell.

Optionally, the bone conduction-based clamping device of the present embodiment may further include a switching element 81 provided on the handle 1. A user can input a switching signal and transmit the switching signal to the controller 2 by the switching element 81. The switching element 81 may be implemented as a button switch, or a toggle switch, or a sensor, such as a photosensitive sensor, a temperature sensor, a humidity sensor, a voice-activated sensor, a capacitive sensor or a combination of at least two of them. Specifically, when the user holds the handle 1 in the hand, the temperature sensor detects a rise of the temperature of the handle 1, which can be considered as triggering a command of turn-on. The controller 2 sends an electrical signal to one or more sound generating members 5 in response to the turn-on signal sent by the switching element 81.

Optionally, the bone conduction-based clamping device of the present embodiment further includes a communication interface 82 for receiving sound information sent by an external device in a wired and/or wireless manner. The controller can convert the sound information sent by the external device into a corresponding electrical signal, and sent it to a corresponding sound generating member 5 to drive the sound generating member 5 to vibrate.

The communication interface 82 includes an interface suitable for receiving an electrical signal, a radio wave, a magnetic signal, an optical signal, and so on that include sound information, such as a USB interface, an eSATA interface, a SD card interface, a MicroSD card interface, an audio input interface, a video input interface, a Wi-Fi interface, a bluetooth interface, a metal electrode, a microphone, etc. The communication interface 82 may include one of the above interfaces, or a combination of multiple interfaces.

Optionally, the controller 2 can also match a corresponding sound source, such as a specific ringtone, according to a food type given by a food selection button set on the handle. Alternatively, the controller 2 can judge a material of food by a sensor such as a pressure sensor set on the clamping device, according to a clamping force given by the sensor, such as hardness or a corresponding relationship between the weight of the food and the clamping force, therefore, different sound sources can be matched according to different materials. It can be understood that the method for determining a type of food is not limited to the above, the disclosure does not limit the method for determining a type of food, and those skilled in the field can choose a specific solution to implement according to actual situations.

The present embodiment provides a bone conduction-based clamping device, includes a handle, a clamping structure provided on one side of the handle, and a sound generating processor provided inside the handle. A user puts food into his mouth cavity by clamping the food with the clamping structure, and a vibration signal generated by the sound generating processor is transmitted to the food by the clamping structure and then transmitted to the user's auditory system by an oral tissue or teeth of the user, thereby avoiding the pressing feeling caused by wearing in a pressing manner. Putting the clamping structure into the user's mouth cavity can also reduce sound leakage, improve sound quality and protect privacy. In addition, the food can also be replaced by the clamping structure, thereby guaranteeing hygiene and health, improving the usage rate of the device, realizing multi-user sharing, and achieving the effects of energy conservation and environmental protection.

Figure 3:
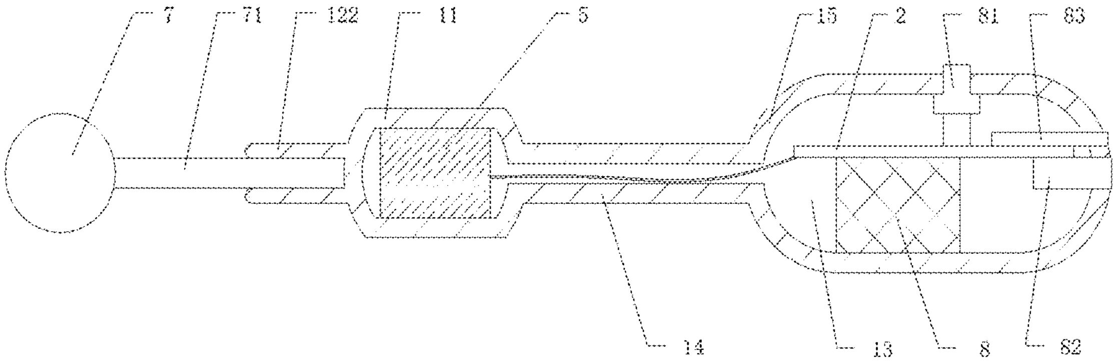
FIG. 3 is a schematic structural diagram of a bone conduction-based clamping device according to another embodiment of the present disclosure.

FIG. 3 is a schematic structural diagram of a bone conduction-based clamping device according to another embodiment of the present disclosure. As shown in FIG. 3, a bone conduction-based clamping device of the present embodiment includes a handle 1, at least one clamping structure 12 provided on one side of the handle 1, and a sound generating processor provided inside the handle, and the sound generating processor includes at least one controller 2 and at least one sound generating member 5.

In the present embodiment, the handle 1 includes at least one head 11, at least one connecting segment 14 and a tail end 15. The sound generating member 5 is packaged in a cavity of the head 11 and connected with the head 11. When the sound generating member 5 vibrates, a vibration signal is transmitted to the head 11, and is then transmitted, by the head 11, to the clamping structure 12 and food 7. The two ends of the connecting segment 14 are connected with the head 11 and the tail end 15, respectively, and the connecting segment 14 can be made into different lengths or a structure with adjustable length. Those skilled in the art may decide the length and specific shape of the connecting segment 14 according to actual situations, and the present embodiment is not limited thereto. The connecting segment 14 may further include a vibration isolation material to prevent vibration from transmitting to the tail end 15 to affect the grip feel and to reduce sound leakage.

In the present embodiment, the clamping structure 12 is an elastic clamping structure 122 that is made of an elastic material such as rubber, silica gel, etc., and has a fixing hole corresponding to a shape of a connecting end 71 of the food 7. Taking the connecting end 71 basically as a cylinder as an example, the fixing hole may be a circular hole. When the fixing hole is in a natural state, an inner diameter of the fixing hole is less than a diameter of the connecting end 71. An end of the fixing hole away from the head 11 may have a rounding or chamfer to facilitate the connecting end 71 to enter the fixing hole. Because the elastic clamping structure 122 is elastic, the connecting end 71 can smoothly enter the fixing hole, the inner diameter of the fixing hole becomes larger to apply a pressure to the connecting end 71, so that the connecting end 71 is fixed in the fixing hole. When the food 7 needs to be removed, a user uses a larger pulling force to overcome the friction between an inner wall of the fixing hole and the connecting end 71, that is the connecting end 71 can be pulled out of the fixing hole. Optionally, the head 11 and the elastic clamping structure 122 can be integrated to enhance the overall strength of the bone-conductive sound generating device.

Other structures of this embodiment are implemented in a manner similar to the embodiment shown in FIG. 2 and will not be repeated here.

Optionally, the controller 2 can also determine a type of a user to which a mouth cavity is corresponding, according to sizes of teeth in the mouth cavity that are acquired by the controller 2, and determine a sound source that is matched with the type of the user, and determine sound volume to be played. Specifically, a micro-camera is provided in the head 11, and when a user opens his mouth, the micro-camera collects a picture of teeth in the user's mouth cavity, and the controller 2 analyzes sizes of the teeth in the collected picture (including tooth shape and/or shape characteristics), and makes matching according to types of users pre-stored in the controller 2 to determine a type of the user. For example, if the tooth size of a child is determined, a music that is suitable for children can be selected, and because children are sensitive to hearing, the sound volume of the music needs to be selected accordingly, such that the sound volume can be adjusted to an appropriate level. Then, when the controller 2 detects that the clamping structure puts food into the user's mouth cavity, the controller 2 can drive the sound generating member 5 to generate a corresponding vibration signal according to the determined sound source and the corresponding sound volume.

Furthermore, in one possible embodiment, when the user has finished eating the food, or when there is no food in the clamping structure, the user puts the clamping structure directly into the mouth cavity, or bites the clamping structure, the controller detects by a sensor such as a pressure sensor that there is no food in the clamping structure, and at the same time detects by another sensor or a switching element that the user is using the clamping device, or has been put the clamping device into the mouth cavity, therefore, the controller 2 stops driving the sound generating member 5 to produce sound and starts a timer or a timing program in the controller 2 to record a duration for the user to put a whole or a part of the clamping structure into the mouth cavity. When the duration is longer than a preset duration threshold, for example, 20 seconds, it is determined that the user wants to continue to use the bone conductive clamping structure to hear sound source information, and the controller re-drives the sound generating member 5 to generate the vibration signal. If the duration is less than or equal to the preset duration threshold, it is determined that the user does not want to continue to use the bone conductive clamping structure, and the controller 2 no longer re-drives the sound generating member 5 to work.

Optionally, in one possible embodiment the tail end 15 further includes an indicator light 83 for indicating an operating status of the bone conduction-based clamping device. The working state of the bone conduction-based clamping device may include a working state of the sound generating member, an electric state of the power source 8, an indication state about whether food is eaten or not, and so on. The indicator light can also be set at the connecting segment 14 or the head 11 to facilitate the user to observe.

The present embodiment provides a bone conduction-based clamping device including a handle, a clamping structure provided on one side of the handle, and a sound generating processor provided inside the handle. A user puts food into his mouth cavity by clamping the food with the clamping structure, and a vibration signal generated by the sound generating processor is transmitted to the food by the clamping structure and then transmitted to the user's auditory system by an oral tissue or teeth of the user, thereby avoiding the pressing feeling caused by wearing in a pressing manner. Putting the clamping structure into the user's mouth cavity can also reduce sound leakage, improve sound quality and protect privacy. In addition, the food can also be replaced by the clamping structure, thereby guaranteeing hygiene and health, improving the usage rate of the device, realizing multi-user sharing, and achieving the effects of energy conservation and environmental protection.

Figure 4:
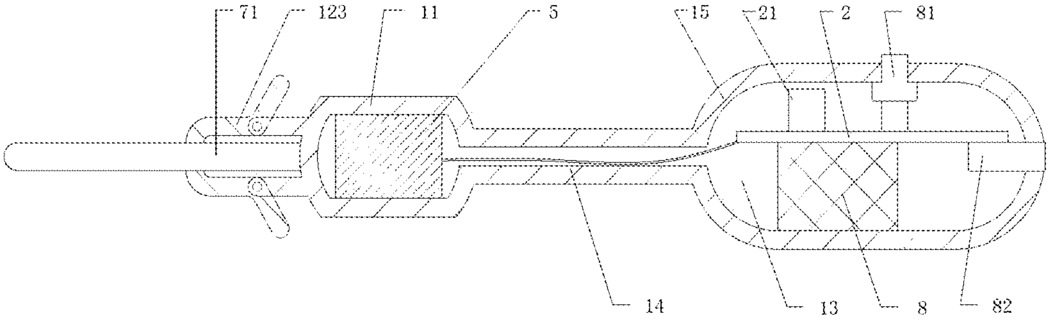
FIG. 4 is a schematic structural diagram of a bone conduction-based clamping device according to still another embodiment of the present disclosure.

FIG. 4 is a schematic structural diagram of a bone conduction-based clamping device according to still another embodiment of the present disclosure. As shown in FIG. 4, a bone conduction-based clamping device of the present embodiment includes a handle 1, at least one clamping structure 12 provided on one side of the handle 1, and a sound generating processor provided inside the handle, and the sound generating processor includes at least one controller 2 and at least one sound generating member 5.

As shown in FIG. 4, in the present embodiment, the clamping structure 12 includes at least one clamping arm 123 and at least one elastic member (not shown in the figures). The clamping arm is rotatably connected to the head 11. When there is more than one clamping arm 123, clamping arms 123 can be relatively rotated, and clamping arms 123 can be connected to the head 11 by separate rotating shafts, or by a same rotating shaft.

In the present embodiment, the controller 2 may further include a memory, sound source information may be pre-stored in the memory, and the controller 2 converts the pre-stored sound source information into a corresponding electrical signal, and transmits the electrical signal to the corresponding sound generating member 5. The memory can be any device suitable for storing information and convenient for the controller to obtain the information, including a semiconductor memory, a magnetic surface memory, etc. The elastic member may be connected to a plurality of clamping arms 123. Alternatively, the elastic member may be set into a plurality of groups of elastic members, which are connected to part of the clamping arms 123, respectively, and each of the elastic members may be connected to at least one clamping arm 123. The elastic member may be a tension spring, a torsion spring or an elastic connector of other forms. When a clamping arm 123 is in a clamping position, an opening formed by a clamping end of the clamping arm is smaller, thereby clamping a connecting end 71 of food 7. A user presses down a pressing end of the clamping arm, so that the clamping arm 123 is in a release position, the opening formed by the clamping end of the clamping arm becomes larger, so that the connecting end 71 of the food 7 can pass through. Due to the action of the elastic element, the clamping arm 123 is in the clamping state when the pressing end is not pressed down by an external force.

Optionally, the controller 2 can also control the release or clamping state of the clamping arm by controlling the rotating shaft of the clamping arm.

Optionally, in the present embodiment, the controller 2 may further include a microphone 21 for collecting voice input of the user, and the controller 2 can store the input voice in a memory to facilitate the personalized customization needs of the user. For example, parents can record blessings in the clamping device, and when children get the clamping device, the blessings can be played automatically.

Optionally, the controller 2 may further include an identification chip for establishing a communication connection with an external device and performing an authentication interaction processing with the external device.

In this example, when an user enters a place with a purchased lollipop, a communication connection can be established, by an identification chip set in the lollipop, with an external device, that is, an authentication device for getting access to the place, and then an electronic ticket in the identification chip is verified by RFID (Radio Frequency Identification) technology or other means, so that the user does not have to hold an independent ticket, thereby effectively improving the utilization rate of the lollipop. Therefore, the lollipop not only can be used to taste with sound data that the user needs hearded, but also can be used as a ticket for coming in and going out a place.

The present embodiment provides a bone conduction-based clamping device including a handle, a clamping structure provided on one side of the handle, and a sound generating processor provided inside the handle. A user puts food into his mouth cavity by clamping the food with the clamping structure, and a vibration signal generated by the sound generating processor is transmitted to the food by the clamping structure and then transmitted to the user's auditory system by an oral tissue or teeth of the user, thereby avoiding the pressing feeling caused by wearing in a pressing manner. Putting the clamping structure into the user's mouth cavity can also reduce sound leakage, improve sound quality and protect privacy. In addition, the food can also be replaced by the clamping structure, thereby guaranteeing hygiene and health, improving the usage rate of the device, realizing multi-user sharing, and achieving the effects of energy conservation and environmental protection.

The inventor of the disclosure also makes an integrated improvement on a bone conductive sound generating member 5, which expands a frequency response range of the bone-conductive sound generating member by increasing the number of electric receiving elements and vibrating elements in the bone-conductive sound generating member, so as to improve sound quality of the bone-conductive sound generating member. Specifically, the sound generating member 5 may has a packaging form that a plurality of elements for actuating vibration are integrated together to depend on the handle 1 to realize packaging. By this integrating way, it can be realized that an independent packaging shell of a traditional bone-conductive sound generating member can be removed, which reduces volume and weight of the clamping device, avoids increasing sound generating members (resulting in the multiple increase of the volume of the bone-conductive sound generating device) to improve sound quality, and greatly decreases production cost of the bone-conductive sound generating device. The removal of the independent packaged shell of the sound generating member may reduce sound quality loss caused by the shell.

The sound generating member 5 in the above embodiment of the disclosure can be implemented in various ways, and structures of the sound generating member 5 are described in detail below.

Figure 5A:
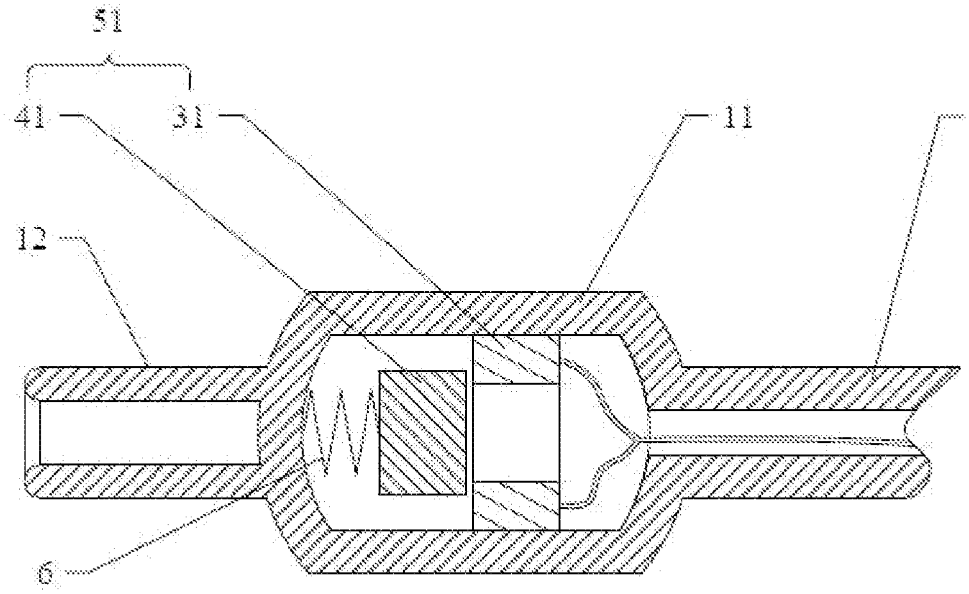
FIGS. 5*a* to 5*e* are schematic structural diagrams of various sound generating members for a bone conduction-based clamping device according to embodiments of the present disclosure.

FIGS. 5*a* to 5*e* are schematic structural diagrams of various sound generating members for a bone conduction-based clamping device according to embodiments of the present disclosure;

As shown in FIG. 5*a*, in an optional embodiment, a sound generating member 5 includes at least one electric receiving element and at least one vibrating element, the electric receiving element in FIG. 5*a* is a first coil 31, and the vibrating element is a magnet 41, but the specific forms of the electric receiving element and the vibrating element are not limited to this.

It should be noted that the magnet 41 in the present embodiment may also be a magnet body composed of a coil, or a magnet body composed of a coil and a magnet. Similarly, the first coil 31 may also be a magnet body composed of a coil and/or a magnet. In this application, a magnet body refers to a member capable of generating a magnetic field or a structural module capable of generating a magnetic field. Magnets and coils mentioned in the following embodiments may have similar implementation, which are described herein and will not be repeated below. The disclosure does not limit the specific form of the magnet body, and all members capable of generating a magnetic field belong to the range of the magnet body described in the disclosure.

The first coil 31 and the magnet 41 form a group of energy conversion unit 51, and the energy conversion unit 51 generates a vibration signal according to an electrical signal sent by a controller 2. When both the electric receiving element and the vibrating element are determined elements, the frequency response characteristic of the energy conversion unit 51 is determined accordingly, and the sound generating member 5 has a fixed frequency response curve. In this embodiment, the function of the energy conversion unit 51 is to convert electric energy into a magnetic field by the first coil 31, and the energized first coil 31 produces the magnetic field, which makes the magnet 41 play magnetic action, so that the magnet 41 applies a pressure to a head 11 by a mechanical connection. Therefore, the head 11 is deformed, and the strength of the magnetic field can be adjusted by the electrical signal, resulting in the change of a deformation amount accordingly. So that the head 11 and the magnet 41 vibrate together, thus the electrical signal sent by the controller 2 is converted into the vibration signal carrying sound information, that is, producing a sound by vibrating is realized.

Optionally, the energy conversion unit 51 may further include at least one elastic structure or elastic element 6 connected to the head 11 to transmit the vibration signal generated by the vibrating element to the head 11. The elastic element or elastic structure 6 includes a spring, a rubber block, etc. The frequency response characteristic of a corresponding energy conversion unit 51 can be adjusted by adjusting a parameter such as a specific form, a structure, a material of the elastic element or elastic structure 6.

FIGS. 5*b* to 5*e* are structural schematic diagrams of a second to fifth energy conversion units according to the present embodiment respectively. As shown in FIGS. 5*b* to 5*e*, in another alternative embodiment, a sound generating member 5 includes at least two electric receiving elements and/or at least two vibrating elements, therefore, the electric receiving elements and the vibrating elements form at least two groups of energy conversion units. Each energy conversion unit is used to generate a corresponding vibration signal in response to an electrical signal sent by a controller 2. When an energy conversion unit includes at least two electric receiving elements and the electric receiving elements are first coils, a plurality of first coils can be provided coaxially, side by side, or in other ways. In each energy conversion unit, if there are vibration groups formed by a plurality of groups of magnets and coils, vibration groups can have different frequency response characteristics, respectively. Optionally, energy conversion units in respective groups can have a same frequency response characteristic, or different frequency response characteristics. When a plurality of energy conversion units have more than two frequency response characteristics, the controller drives different energy conversion units to work, resulting in different frequency response curves. Therefore, one or more groups of energy conversion units with specific frequency response characteristics can be selected according to specific conditions, which can significantly improve sound quality.

Figure 5B:
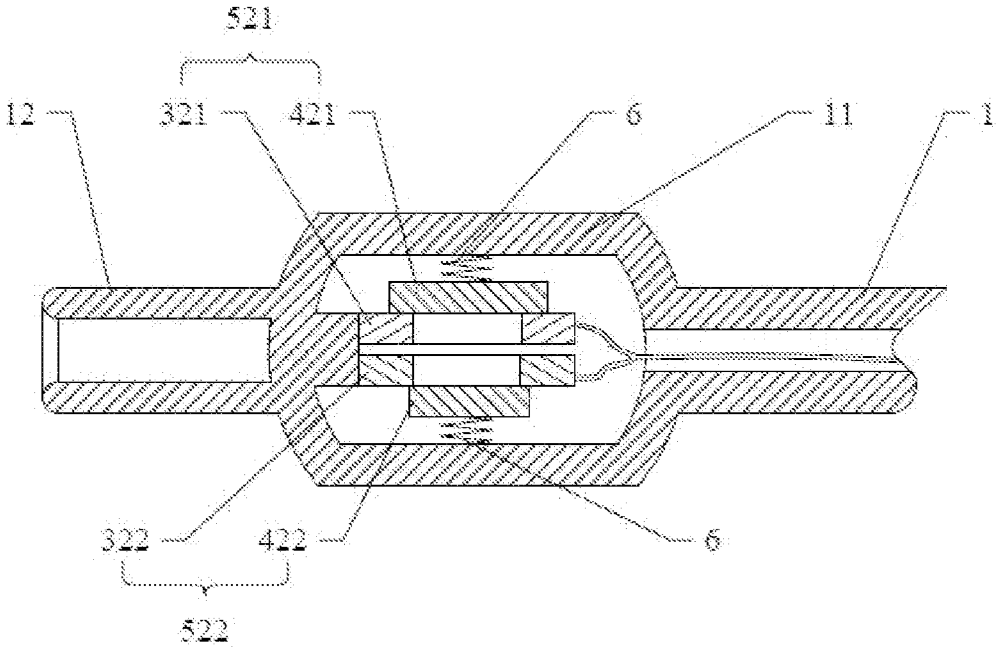

As shown in FIG. 5*b*, in an optional embodiment, electric receiving elements and vibrating elements are the same in number, and an electric receiving element is in one-to-one correspondence with a vibrating element, and each electric receiving element is electrically connected to a controller 2 and drives a corresponding vibrating element to vibrate, thereby forming a plurality of groups of energy conversion units. A lollipop based on bone conduction shown in FIG. 5*b* includes two electric receiving elements and two vibrating elements to form two groups of energy conversion units, namely, an energy conversion unit 521 and an energy conversion unit 522. The plurality of groups of energy conversion units may be different in frequency response characteristic. The controller 2 can drive one or more groups of energy conversion units having a corresponding frequency response characteristic to vibrate according to a frequency band feature of sound information. Specifically, the controller 2 sends a corresponding electrical signal to one or more groups of energy conversion units having a frequency of a resonant peak that has the highest matching degree with the frequency band feature of the sound information. In FIG. 5*b*, electric receiving elements are a first coil 321 and a first coil 322, and vibrating elements are a magnet 421 and a magnet 422, but the specific forms of the electric receiving elements and vibrating elements are not limited thereto.

Figure 5C:
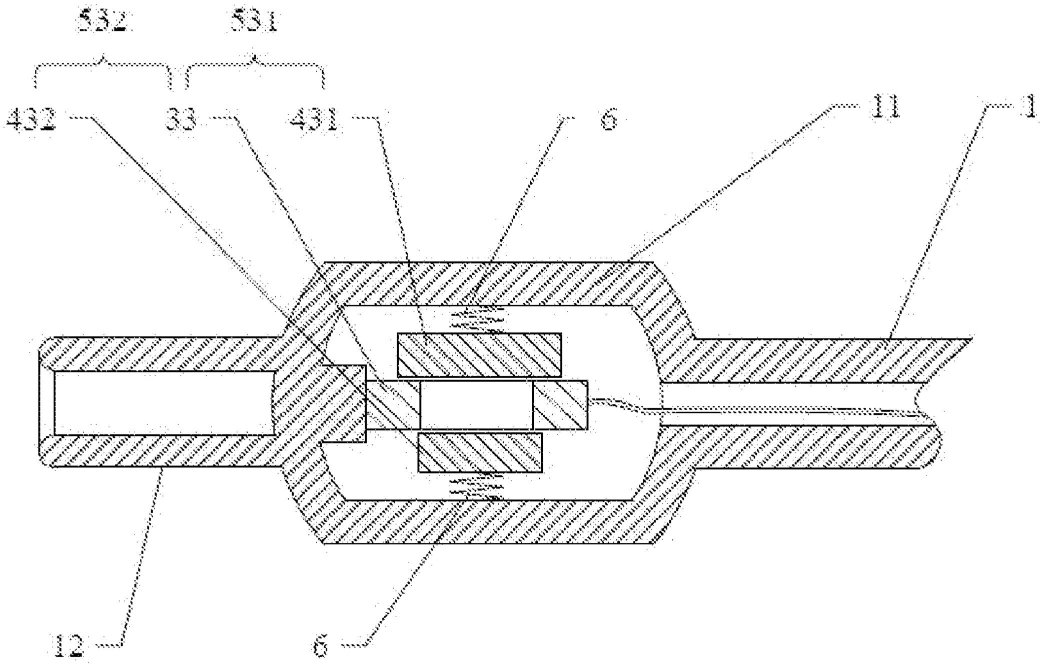

In another alternative embodiment, as shown in FIG. 5*c*, a sound generating member includes at least two vibrating elements and forms at least two groups of energy conversion units, and the at least two groups of energy conversion units have a common electric receiving element, that is, at least one electric receiving element can drive more than two different vibrating elements. In FIG. 5*c*, an electric receiving element is a first coil and a vibrating element is a magnet. Of course, the electric receiving element and the vibrating element can also be other elements. As shown in FIG. 5C, the sound generating member includes a first coil 33 and two magnets 431 and 432, the two magnets 431 and 432 are respectively provided on both sides of the first coil 33, and the two magnets 431 and 432 are within an effective range of a magnetic field generated by the first coil 33. That is, the first coil 33 can drive both the magnet 431 and the magnet 432, thereby forming two groups of energy conversion units, namely, an energy conversion unit 531 and an energy conversion unit 532. Of course, two magnets 431 and 432 may also be provided on the same side of the first coil 33. The two magnets 431 and 432 can be different in parameters such as weight, size, material, and magnetic air gap between the first coil 33 and the two magnets 431 and 432, so that the two groups of energy conversion units 531 and 532 have different frequency response characteristics. When a controller 2 sends an electrical signal to the first coil 33, the two magnets 431 and 432 are driven to vibrate, thus a vibration signal outputted by a bone conduction-based lollipop is in a superposition effect of the two groups of energy conversion units 531 and 532. Therefore, the sound quality of the bone conduction-based lollipop can be improved and the overall volume of a sound module can be reduced. The two groups of energy conversion units 531 and 532 in FIG. 5*c* may be formed into a pair of energy conversion units, and those skilled in the art may set one or more pairs of energy conversion units as shown in FIG. 5*c* in a sound generating member according to actual needs.

Figure 5D:
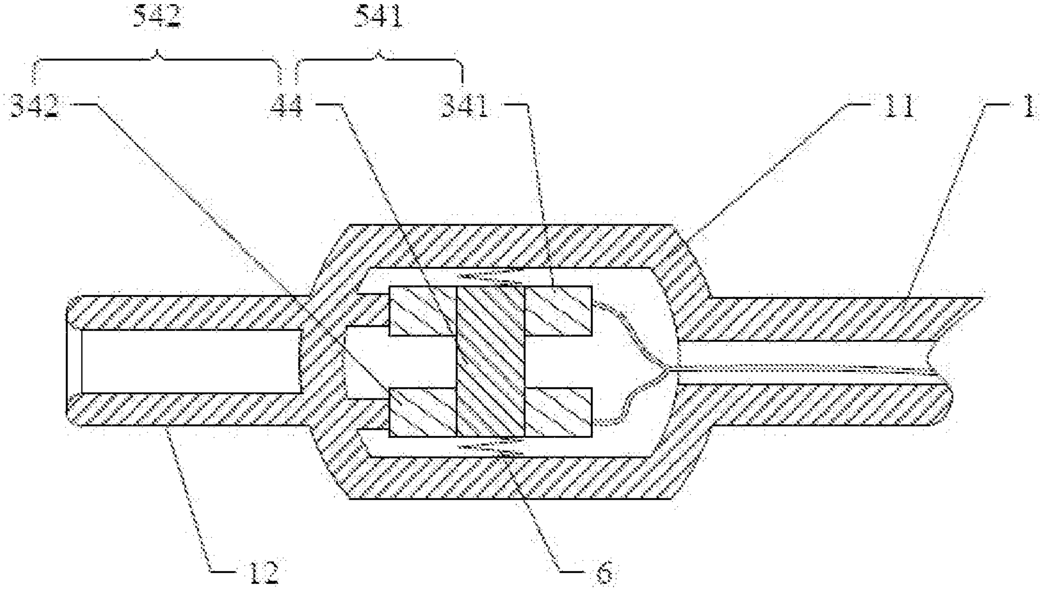
Figure 5E:
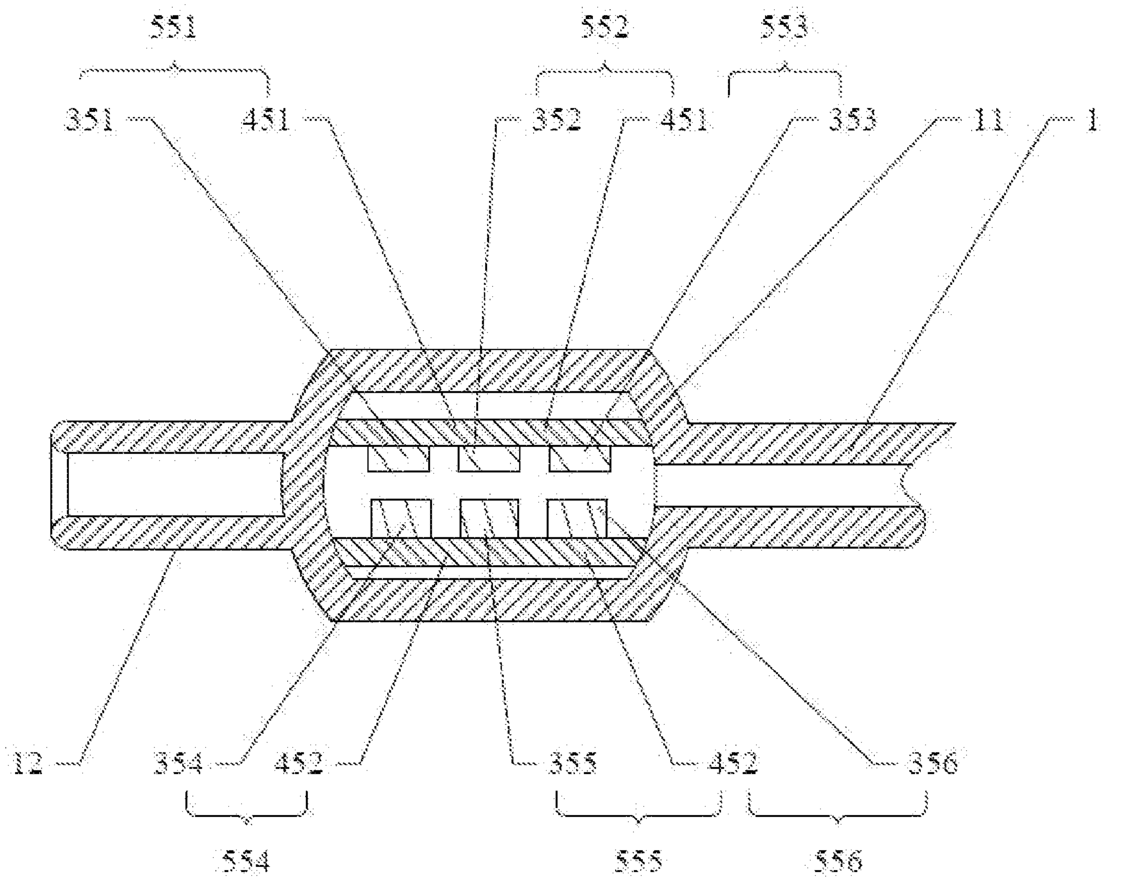

In another alternative embodiment, as shown in FIGS. 5*d* and 5*e*, a sound generating module includes at least two electric receiving elements and forms at least two groups of energy conversion units, and the at least two groups of energy conversion units have a common vibrating element, that is, at least one vibrating element can be driven by the at least two electric receiving elements respectively to vibrate, thereby reducing the overall volume of the sound generating module. In FIG. 5*d*, electric receiving elements are first coils and a vibrating element is a magnet. In FIG. 5*e*, electric receiving elements are piezoelectric sheets and vibrating elements are vibrating diaphragms. Understandably, the electric receiving elements and the vibrating elements can also be other members.

Furthermore, optionally, as shown in FIG. 5*d*, a sound generating member includes two first coils 341, 342 and a magnet 44, and the magnet 44 is within an effective range of a magnetic field generated by the two first coils 341 and 342, that is, the magnet 44 can be driven by both the first coil 341 and the first coil 342, thereby forming two groups of energy conversion units, namely an energy conversion unit 541 and an energy conversion unit 542. It is understandable that those skilled in the art can set up more electric receiving elements to share one vibrating element so as to form multiple groups of energy conversion units. The two first coils 341 and 342 may be provided on a same side of the magnet 44, or at both ends of the magnet 44 respectively. Optionally, the magnet 44 and the two first coils 341, 342 are coaxially provided to facilitate balanced drive of the magnet 44. The two first coils 341 and 342 can be different in the number of windings, material, and magnetic air gap between the two first coils 341 and 342 and the magnet 44, so that the two groups of energy conversion units 541 and 542 have different frequency response characteristics. A controller 2 can send an electrical signal to one of the first coils to drive the magnet for vibration according to a frequency band feature of sound information. Specifically, the controller 2 sends a corresponding electrical signal to a group of energy conversion unit having a frequency of a resonant peak that has the highest matching degree with the frequency band feature of the sound information. The controller 2 can also send electrical signals to the two first coils 341 and 342, so that the magnet 44 is driven by a superimposed alternating magnetic field generated by the two first coils 341 and 342, which makes the magnet 44 increase in amplitude, thereby increasing sound volume. The two groups of energy conversion units 541 and 542 in FIG. 5*d* can be formed into a pair of energy conversion units, and those skilled in the art may set one or more pairs of energy conversion units as shown in FIG. 5*d* in a sound generating member according to actual needs.

Furthermore, optionally, as shown in FIG. 5*e*, a sound generating member includes two vibrating diaphragms 451, 452 and six piezoelectric sheets 351, 352, 353, 354, 355, 356, where three piezoelectric sheets 351 to 353 are mechanically connected to different positions on one vibrating diaphragm 451, and the other three piezoelectric sheets 354-356 are mechanically connected to different positions on another diaphragm 452, that is, three piezoelectric sheets share one vibrating diaphragm. As a result, the sound generating member 5 forms six groups of energy conversion units, namely energy conversion units 551 to 556. The vibratings diaphragm are connected to a handle 1, and the piezoelectric sheets are stimulated by an electrical signal to mechanically deform, which brings the vibrating diaphragms to generate a vibration signal, and the vibrating diaphragms transmit the vibration signal to the handle 1. By changing the type of the piezoelectric sheets, the connection positions between the piezoelectric sheets and the vibrating diaphragms, and the size and material of the vibrating diaphragms, etc., frequency response characteristics of the groups of the energy conversion units can be adjusted. The frequency response characteristics of the six groups of the energy conversion units 551 to 556 in FIG. 5*e* can be completely different, thus the frequency response range of the sound module can be further broadened.

It is understandable that the number of the above-mentioned piezoelectric sheets is not limited to three, that is, piezoelectric sheets can be set to at least one. A position of a piezoelectric sheet is not limited in this application, and those skilled in the art can set the number of the piezoelectric sheet and a position of each piezoelectric sheet on a vibrating diaphragm according to specific situations.

The separate packaging of a sound generating member is removed in the above embodiments, which makes the design structure of a bone conductive sound generating member simple and highly integrated, increases the audio frequency domain range of the bone conductive sound generating member, improves the problem of poor sound quality caused by a loss of low and high sound frequency bands in traditional bone conductive sound production, achieves the miniaturization of a bone conduction-based clamping device, and reduces sound quality loss of the device, thereby improving sound quality.

Figure 6:
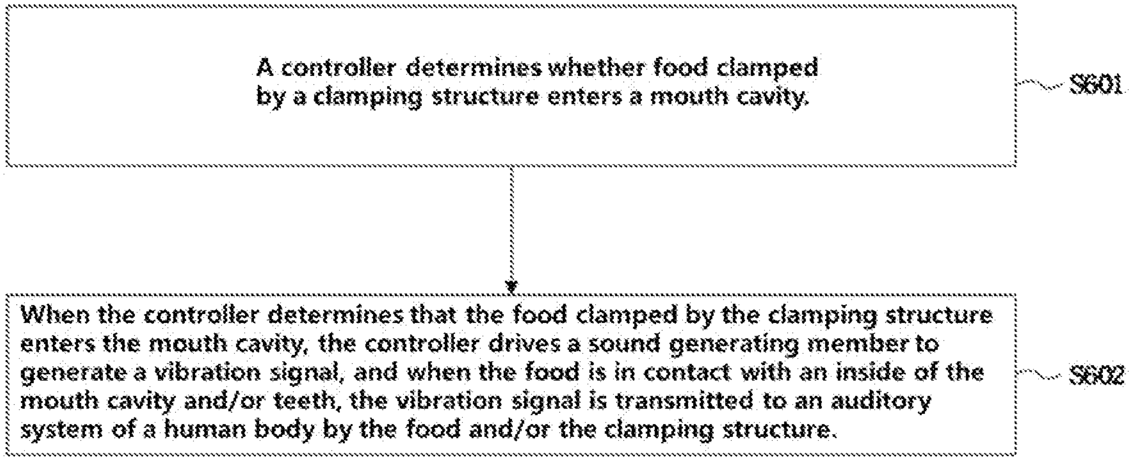
FIG. 6 is a schematic flow diagram of a bone conduction-based clamping processing method according to an embodiment of the present disclosure.

FIG. 6 is a schematic flow diagram of a bone conduction-based clamping processing method according to an embodiment of the present disclosure, as shown in FIG. 6, the method includes:

S601. a controller determines whether food clamped by a clamping structure enters a mouth cavity.

S602, when the controller determines that the food clamped by the clamping structure enters the mouth cavity, the controller drives a sound generating member to generate a vibration signal, and when the food is in contact with an inside of the mouth cavity and/or teeth, the vibration signal is transmitted to an auditory system of a human body by the food and/or the clamping structure.

In the present embodiment, the method can be applied to the bone conduction-based clamping device as shown above in FIG. 1, both of them have similar implementation principle and technical effects, which will not be discussed here.

Optionally, it is desired that when a user selects different types of food to be clamped, different sounds can be to intelligently matched, therefore, the function of helping the user with functional visual impairment to identify food can be achieved.

Figure 7:
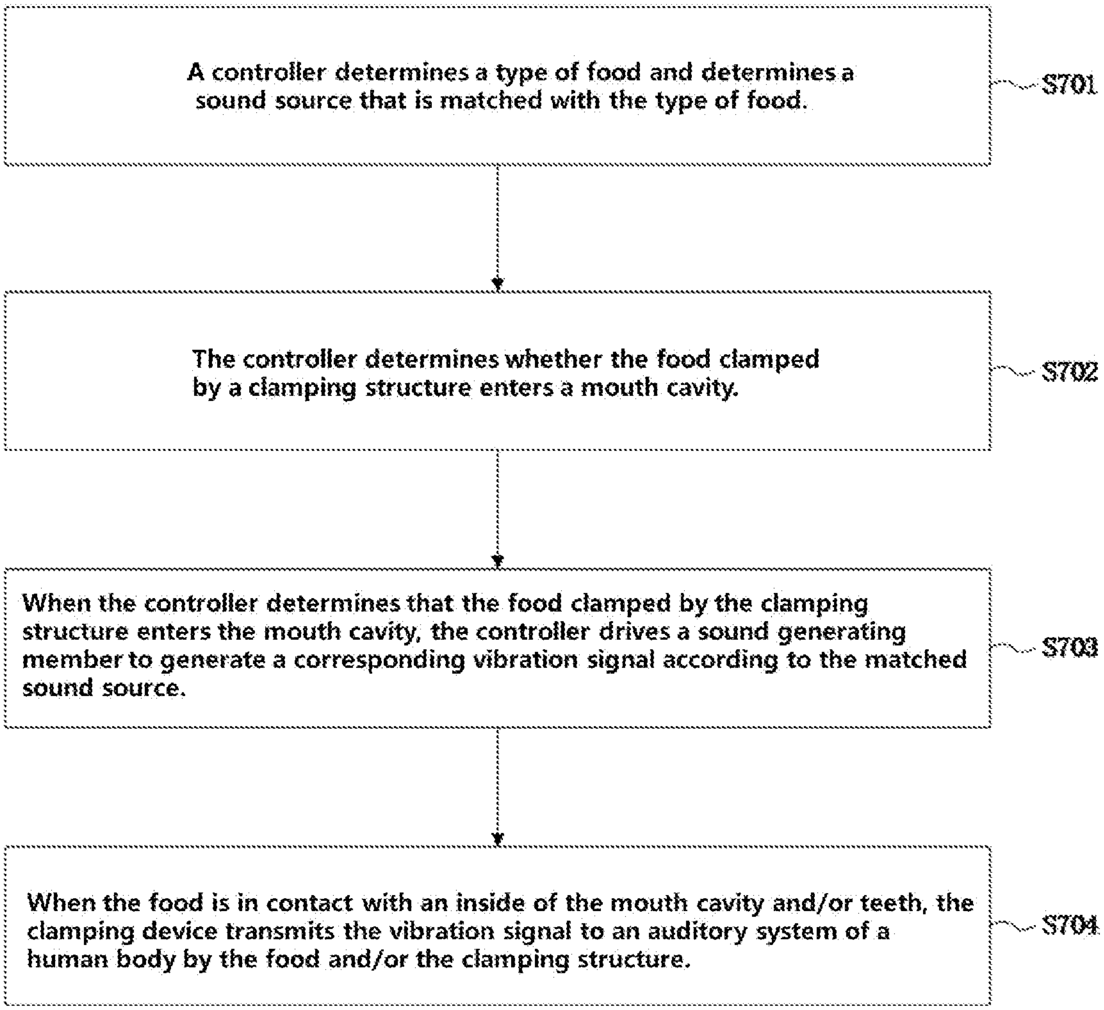
FIG. 7 is a schematic flow diagram of a bone conduction-based clamping processing method according to another embodiment of the present disclosure.

FIG. 7 is a schematic flow diagram of a bone conduction-based clamping processing method according to another embodiment of the present disclosure, as shown in FIG. 7, the method includes:

S701, a controller determines a type of food and determines a sound source that is matched with the type of food.

A controller can match a corresponding sound source, such as a specific ringtone, according to a food type given by a food selection button set on a handle. A material of food can also be judged, according to a clamping force given by a sensor, such as hardness or a corresponding relationship between weight of the food and the clamping force, therefore, different sound sources can be matched according to different materials.

S702, the controller determines whether the food clamped by a clamping structure enters a mouth cavity.

S703, when the controller determines that the food clamped by the clamping structure enters the mouth cavity, the controller drives a sound generating member to generate a corresponding vibration signal according to the matched sound source.

S704, when the food is in contact with an inside of the mouth cavity and/or teeth, the clamping device transmits the vibration signal to an auditory system of a human body by the food and/or the clamping structure.

In the present embodiment, the method can be applied to the bone conduction-based clamping device shown in FIG. 1 above, both of them have similar implementation principle and technical effects, which will not be discussed here.

For the methods in the above embodiments, in order to intelligently match an identity type of an user, a controller can also determine the type of the user corresponding to a mouth cavity according to sizes of teeth in the mouth cavity that are acquired by the controller, and determine a sound source that is matched with the type of the user, as well as sound volume to be played in a possible embodiment.

Driving the sound generating member to generate the vibration signal includes driving the sound generating member to generate a corresponding vibration signal according to the matched sound source and the played sound volume.

In another possible design, after it is automatically determined that clamped food is eaten up, or when there is no food to be clamped, it is intelligently determined whether a user still needs a clamping device to work, so as to improve user's sense of experience. The above embodiments may further include that the controller stops driving the sound generating member when the controller determines that the clamping structure does not hold food and that the whole or part of the clamping structure enters the mouth cavity, and determines a duration for holding the whole or part of the clamping structure in the mouth cavity;

when the controller determines that the duration for holding the whole or part of the clamping structure in the mouth cavity is greater than a preset duration threshold, the controller redrives the sound generating member to generate the vibration signal.

After considering the specification and practicing the disclosure disclosed herein, those skilled in the art will easily think of other embodiments of the disclosure. The purpose of the disclosure is to cover any variant, use or adaptive change of the disclosure, these variants, uses or adaptive changes follow general principles of the disclosure, and include common knowledge or conventional technical means in the technical field that is not disclosed in the present disclosure. The specification and embodiments are only regarded as exemplary, and the true scope and spirit of the present disclosure are indicated by the appended claims.

It should be understood that the present disclosure is not limited to the precise structure described above and shown in the drawings and various modifications and changes can be made without departing from its scope. The scope of the present disclosure is limited only by the appended claims.

What is claimed is:

1. A bone conduction-based clamping device, wherein the bone conduction-based clamping device comprises a handle, a clamping structure provided on one side of the handle, and a sound generating processor provided inside the handle; wherein the sound generating processor comprises a controller and a sound generating member;

the controller is configured to drive the sound generating member to generate a vibration signal when the controller determines that food clamped by the clamping structure enters a mouth cavity, and transmit the vibration signal to an auditory system of a user by the food and/or the clamping structure when the food is in contact with an inside of the mouth cavity and/or teeth;

wherein the controller is further configured to stop driving the sound generating member and determine a duration for which a whole or a part of the clamping structure is held in the mouth cavity, when the controller determines that the clamping structure does not clamp the food and the whole or the part of the clamping structure enters the mouth cavity;

the controller is further configured to re-drive the sound generating member to generate the vibration signal, when the controller determines that the duration is greater than a preset duration threshold.

2. The bone conduction-based clamping device according to claim 1, wherein the clamping structure is an elastic clamping structure or a clamp-type clamping structure.

3. The bone conduction-based clamping device according to claim 1, wherein the clamping structure is a nut clamping structure comprising a clamping nut and a clamping claw.

4. The bone conduction-based clamping device according to claim 1, wherein the controller is further configured to determine a type of the food and determine a sound source that is matched with the type of the food;

the controller is specifically configured to drive the sound generating member to generate a corresponding vibration signal according to the matched sound source, when the controller determines that the food clamped by the clamping structure enters the mouth cavity.

5. The bone conduction-based clamping device according to claim 1, wherein the controller is further configured to, according to sizes of the teeth inside the mouth cavity that are acquired by the controller, determine a type of the user corresponding to the mouth cavity, determine a sound source that is matched with the type of the user, and determine sound volume to be played;

the controller is specifically configured to drive the sound generating member to generate a corresponding vibration signal according to the matched sound source and the played sound volume, when the controller determines that the food clamped by the clamping structure enters the mouth cavity.

6. The bone conduction-based clamping device according to claim 1, wherein the sound generating member comprises one or more combinations of the following:

a piezoelectric bone-conductive sound generating member and an electromagnetic bone-conductive sound generating member.

7. The bone conduction-based clamping device according to claim 1, wherein the bone conduction-based clamping device further comprises a switching element provided on the handle;

the controller is further configured to drive the sound generating member to generate the vibration signal when the controller determines that the switching element is activated, and transmit the vibration signal to the auditory system of the user by the food and/or the clamping structure when the food is in contact with the inside of the mouth cavity and/or the teeth.

8. The bone conduction-based clamping device according to claim 1, wherein the bone conduction-based clamping device further comprises a communication interface, and the communication interface comprises one or more combinations of the following:

a USB interface, an eSATA interface, a SD card interface, a Micro SD card interface, an audio input interface, a video input interface, a Wi-Fi interface, a bluetooth interface, a metal electrode, and a microphone.

9. The bone conduction-based clamping device according to claim 1, wherein the bone conduction-based clamping device further comprises a power supply element that is configured to supply power to the controller and the sound generating member.

10. A bone conduction-based clamping processing method, wherein the method is applied to the bone conduction-based clamping device according to claim 1, the method comprises:

the controller is configured to determine whether the food clamped by the clamping structure enters the mouth cavity;

the controller is configured to drive the sound generating member to generate the vibration signal when the controller determines that the food clamped by the clamping structure enters the mouth cavity, and transmit the vibration signal to the auditory system of the user by the food and/or the clamping structure when the food is in contact with the inside of the mouth cavity and/or the teeth;

wherein the method further comprises:

the controller is configured to stop driving the sound generating member and determine a duration for which a whole or a part of the clamping structure is held in the mouth cavity, when the controller determines that the clamping structure does not clamp the food and the whole or the part of the clamping structure enters the mouth cavity;

the controller is configured to re-drive the sound generating member to generate the vibration signal, when the controller determines that the duration is greater than a preset duration threshold.

11. The bone conduction-based clamping processing method according to claim 10, wherein the method further comprises:

the controller is configured to determine a type of the food and determine a sound source that is matched with the type of the food;

driving the sound generating member to generate the vibration signal comprises driving the sound generating member to generate a corresponding vibration signal according to the matched sound source.

12. The bone conduction-based clamping processing method according to claim 10, wherein the method further comprises:

the controller is configured to, according to sizes of the teeth inside the mouth cavity that are acquired by the controller, determine a type of the user corresponding to the mouth cavity, determine a sound source that is matched with the type of the user, and determine sound volume to be played;

driving the sound generating member to generate the vibration signal comprises driving the sound generating member to generate a corresponding vibration signal according to the matched sound source, and the played sound volume.

* * * * *